Nov. 7, 1933.  W. I. BALLENTINE ET AL  1,934,160
COMBINE
Filed March 6, 1930   4 Sheets-Sheet 1
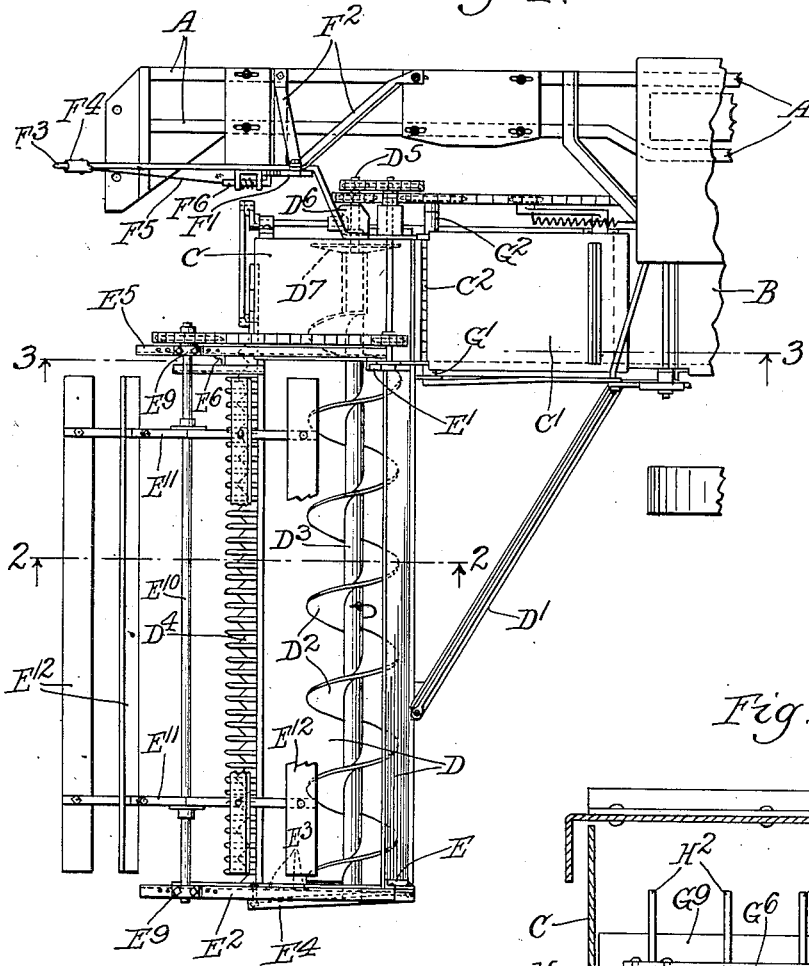
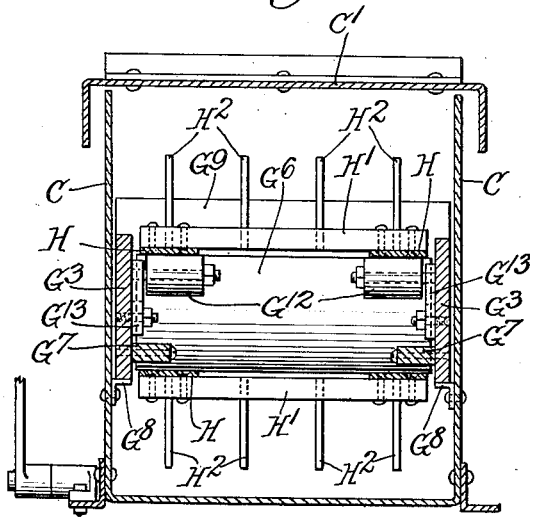
Inventors
William I. Ballentine
Amadee J. Knapp
by Parker + Carter
Attorneys.

Nov. 7, 1933.  W. I. BALLENTINE ET AL  1,934,160
COMBINE
Filed March 6, 1930  4 Sheets-Sheet 2

Inventors
William I. Ballentine
Amadee J. Knapp
by Parker + Carter
Attorneys.

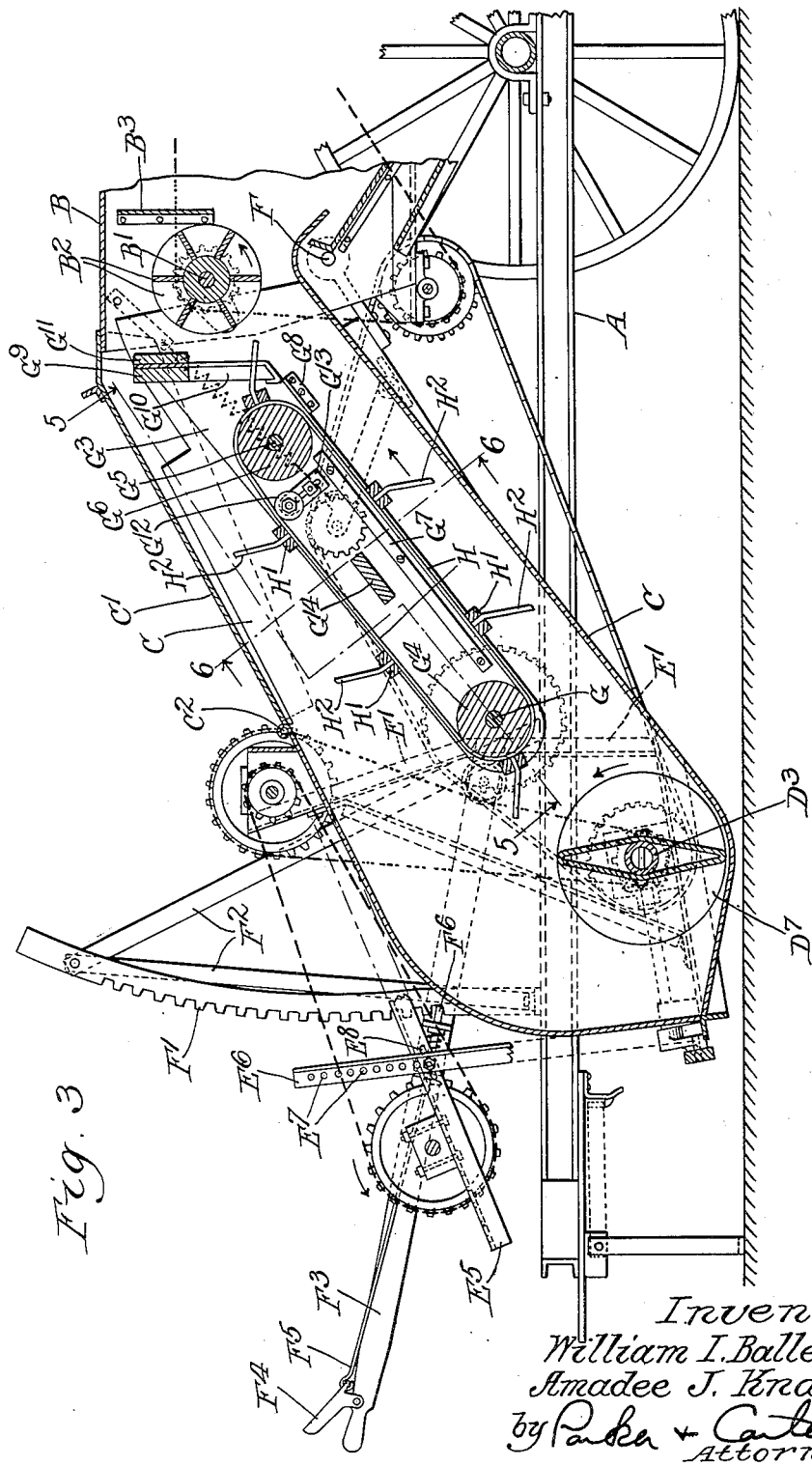

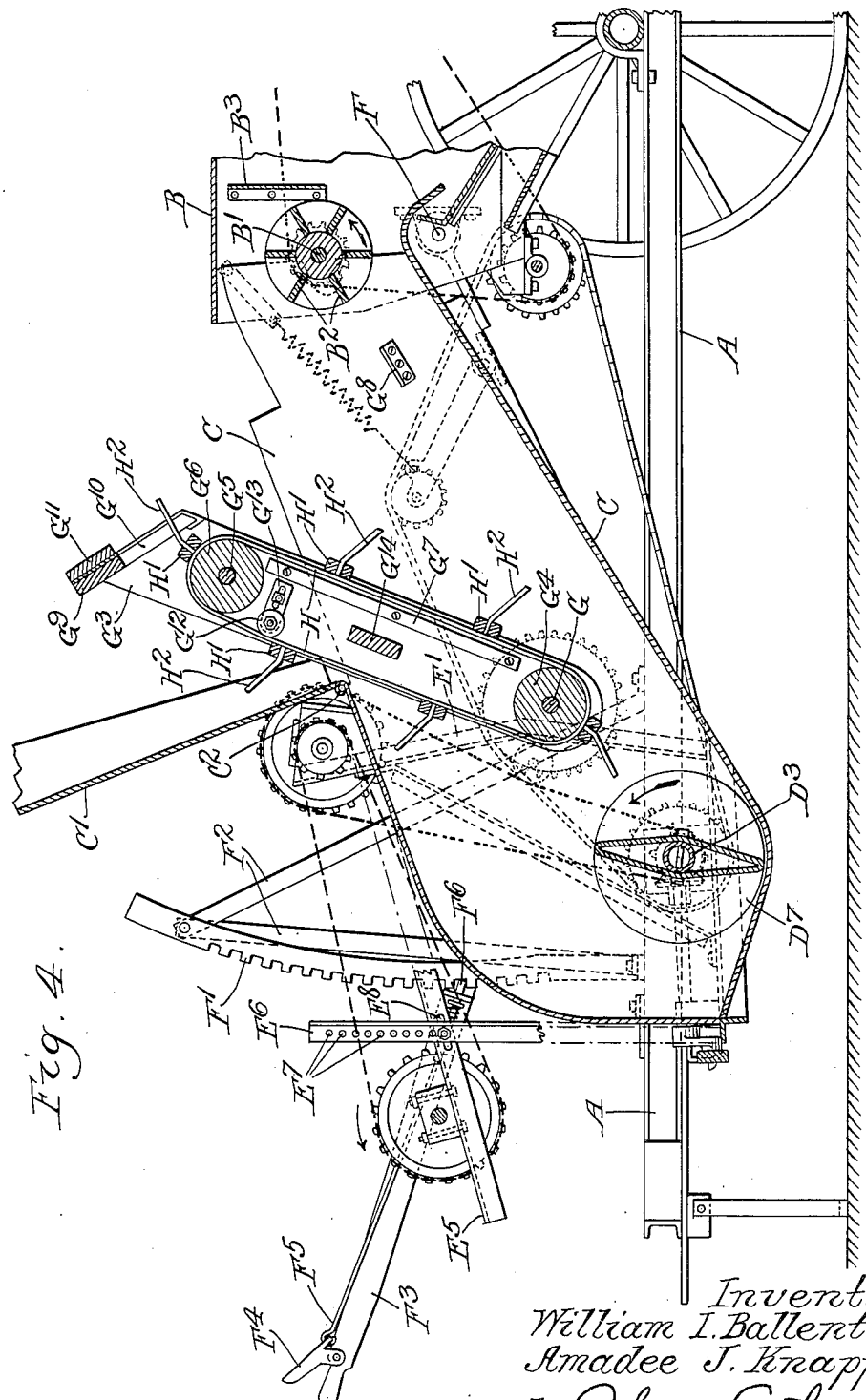

Patented Nov. 7, 1933

1,934,160

UNITED STATES PATENT OFFICE 1,934,160

COMBINE

William I. Ballentine and Amadee J. Knapp, La Porte, Ind., assignors, by mesne assignments, to Allis-Chalmers Manufacturing Company, a corporation of Delaware Application March 6, 1930. Serial No. 433,606

13 Claims. (Cl. 56—122)

This invention relates to a harvester-combine, and particularly to means for conveying the grain into and within the combine.

One object is to provide a conveyor associated with means for gathering grain, which conveyor moves the grain toward and initially into the combine, in combination with a sickle conveyor which takes the grain from the first conveyor and moves it along in the combine toward the threshing mechanism. Another object is to provide, in connection with the combine, such a conveyor so shaped and associated that the second conveyor positively removes material from the first conveyor.

Other objects will appear from time to time in the specification and claims.

The invention is illustrated more or less diagrammatically in the accompanying drawings, wherein Fig. 1 is a plan view of that portion of a combine to which the conveyor is applied;

Fig. 2 is a transverse vertical cross section on an enlarged scale, taken at line 2—2 of Fig. 1;

Fig. 3 is a transverse vertical cross section taken at line 3—3 of Fig. 1, with the secondary conveyor in its working position;

Fig. 4 is a view similar to Fig. 3, with the secondary conveyor in an inoperative position;

Fig. 5 is a horizontal longitudinal cross section taken generally at line 5—5 of Fig. 3;

Fig. 6 is a transverse vertical cross section taken at line 6—6 of Fig. 3.

Like parts are designated by like characters throughout the specification and drawings.

The conveying mechanism is shown in the drawings as being associated with a combine, that is to say, with a machine in which grain is separated or threshed. The conveyor assembly is particularly adapted for this use but may be used in other associations. For that reason only enough of the combine is shown to indicate the general assembly and the carrying and supporting parts for the conveying assembly.

The letter A designates generally a supporting frame and running gear. It may be of any suitable form and it is sufficient that it provides a supporting structure large enough and strong enough to carry the parts positioned on it or supported from it. It may be, as shown, wheels or any other suitable support.

B indicates generally a housing which may include a separate assembly. Positioned within the housing, between the conveyor which will be described below, and the separating assembly, is a shaft $B^1$ which carries a beater $B^2$. $B^3$ is a baffle located within the housing B and positioned on the opposite side of the beater from the conveyor mechanism.

Toward the forward end of the machine is a conveyor assembly which is inclosed within a conveyor housing C. This housing is provided with a cover $C^1$ which is hinged as at $C^2$ to the housing.

A cutting and pickup assembly may be provided and in the form here shown it is positioned so as to extend laterally and somewhat forwardly of the combine. It includes an open sided apron or housing D. $D^1$ is a brace and support for this housing. $D^2$ is a screw conveyor or auger having a shaft $D^3$. These parts are positioned for rotation within the apron. The auger is rotating in the direction of the arrow indicated in Fig. 4 and when so rotated moves grain or other material with which it may come in contact toward the housing C. A sickle bar $D^4$ may be located as shown along the forward edge of the apron D. The means of operating the sickle bar are not shown as they form no particular part of the present invention. If the sickle bar is provided at all, means are provided for moving it back and forth so as to cut the grain with which it comes in contact. $D^5$ is a shaft journaled in the housing $D^6$ within which a portion of the driving mechanism for the auger is provided. The details of the driving mechanism are not shown as any suitable driving mechanism may be provided. $D^7$ is a terminal and shielding member which may be mounted at the inner end of the auger.

Forming a part of the frame for the apron member D and extending upwardly from it are members E, $E^1$ located at opposite ends of the apron, the member E being somewhat shorter than the member $E^1$. Extending forwardly from the member E is a frame member $E^2$. It is provided with a plurality of perforations $E^3$ and is adjustably mounted at one end on the member E. $E^4$ is an angle bracing member mounted at one end on the lower portion of the member E and at its other end mounted in one of the perforations $E^3$ of the member $E^2$. Extending forwardly from the upper portion of the member $E^1$ is a frame member $E^5$. At one end it is pivotally fastened to the member $E^1$ and intermediate its ends it is supported on a generally vertical member $E^6$ which is provided with a plurality of perforations $E^7$. The member $E^5$ is provided with a slot $E^8$. By means of a pin, bolt or other attachment the member $E^5$ is thus supported by the member $E^6$ and may be adjusted throughout a considerable range of positions. Supported on the members E², E⁵ are bearings E⁹ in which is journaled a shaft E¹⁰ of a reel E¹¹ which carries bats or beaters E¹². The reel is thus adjustably supported on a frame work which is itself carried on the apron and frame work which carries the screw conveyor and the sickle bar assembly.

The pick up mechanism including the reel, sickle bar assembly, screw conveyor and the housing C, with the conveying mechanism which it encloses, are all mounted and assembled as a unit and are adjustably supported on the main frame at F. About this point as an axis this assembly may have a rotary movement. The assembly may be supported in its position and adjusted about the point F by any suitable means and it may or may not be counter-balanced so as to reduce the effort necessary to raise or lower it. Projecting upwardly from the frame members A is a toothed quadrant F¹. It is supported and braced by members F², F² which are themselves also mounted upon the frame members A. F³ is a lever attached to the frame of the pick up and conveyor assembly just mentioned. By means of it this assembly may be raised and lowered. The lever F³ is provided with a hand piece F⁴ which through a member F⁵ may be used to manipulate the catch F⁶ to engage the teeth of the quadrant F¹. When the catch is so engaged, movement of the assembly is impossible. When it has been removed from engagement, the assembly may be raised and lowered by manipulation of the handle.

Within the casing C is mounted the conveyor assembly by means of which the grain which has been cut and picked up is conveyed to the threshing and separating zone.

G is a shaft positioned within the housing C and supported in bearings G¹, G² mounted on the housing. Positioned on the shaft for limited movement about it are frame member G³, G³. Mounted on the shaft for rotation about it is a belt roller G⁴. Supported by the frame members G³, G³ is a shaft G⁵ about which is mounted for rotation a belt supporting roller G⁶. Mounted along the inside of the frame members G³, G³ and preferably adjacent their lower edges are belt guiding members G⁷, G⁷. G⁸, G⁸ are positioning and supporting brackets mounted inside the housing C and adapted to support the conveyor when it is in the separating position as shown in Figures 3, 5 and 6. The frame members G³ extend beyond the shaft G⁵ and roller G⁶ and adjacent their ends and extending across between them is a comb member G⁹ provided with slots G¹⁰ and a reinforcing and stiffening cross member G¹¹. G¹², G¹² are belt tightening rollers adjustably supported from bracket members G¹³ and by means of these rollers and their adjustable mountings tension of the belt may be controlled. G¹⁴ is a cross member joining the frame members G³, G³.

Mounted about the rollers G⁴ and G⁶ are a pair of belts H, H. These belts may be joined by one or more slats H¹. In the present case six such slats are used. Fixed on the slats are fingers H² which may be rearwardly inclined with respect to the direction of motion as shown. The belt moves in the direction of the arrow shown in Figure 3. The fingers H² pass through the slots G¹⁰ in the comb G⁹.

The driving belts and connections are only diagrammatically indicated and are not described in detail. It is sufficient for the purpose of invention that the auger or screw conveyor be driven in the direction of the arrow as indicated in Figs. 3 and 4 and that the belt conveyor having the fingers or projections and mounted within the housing C, be driven in the direction of the arrow indicated in connection with that conveyor in Fig. 3, and that the beater B² be driven as indicated by the arrow on that member in Figs. 3 and 4. While we have shown a reel and while this is ordinarily used, it might be omitted. If it is used it will preferably be driven in the direction indicated by the arrow in connection with that member in Fig. 2.

The use and operation of this invention are as follows:

When the machine is about to be put in use, the cutting and feeding assembly is rotated about its pivot point F and is adjusted to a suitable height above the ground. The proper position of adjustment depends, of course, on the type of grain or other material to be handled and upon the condition of the ground and other factors. The apparatus is such that the operator can adjust this to proper height. When this adjustment has been made it is fixed by permitting the catch F⁶ to engage the notches in the member F¹ and the parts are held in adjusted position. The combine is then moved ahead by the tractor or other suitable towing means and the parts operate. The reel operates to draw or drive the grain toward the sickle bar which upon coming in contact with the grain, cuts it. Grain is then driven upon the apron which partially enclosed the large screw conveyor. By this conveyor the grain is moved laterally toward the belt conveyor which is positioned within the housing C. This belt conveyor rotates so as to engage the grain beneath it and carry it upward beneath it toward the first beater B². Most of the grain is taken from contact with the belt and the fingers by means of this beater B², but whatever grain is not removed in this fashion is removed when the fingers H² pass through the comb structure.

The belt conveyor on the housing C is positioned so that it can be raised bodily as shown in Figure 4. This may be done in the form shown herewith because the conveyor is pivoted at its lower end, the housing is provided with a cover which may be opened and when this cover is open the belt conveyor assembly may be rotated upwardly as shown in Figure 4 and then it may be cleaned, repaired or otherwise adjusted, or the passage in which it operates may be cleaned. It is possible through an opening in the top of the casing C when it is open to get at the beater B² and a part of the cylinder and concave.

We claim:

1. In combination in a grain conveying assembly, a housing, a conveying element adapted to receive and convey grain, means for movably mounting said conveying element in operative position with a portion of the conveying element disposed within said housing under normal operating conditions, and means for driving said conveying element, said conveying element being movable relative to said housing into and out of a position wherein said portion of the conveying element normally positioned within said housing projects from said housing.

2. In combination in a grain conveying assembly, a support, a conveying element adapted to receive and convey grain and including a belt having conveying fingers, and means for driving said conveying element, said conveying element being movably mounted in operative position on said support and being movable relative thereto into and out of normal working position thereon.

3. In combination in a grain conveying assembly, a support, a conveying element adapted to receive and convey grain and including a belt having conveying fingers, and means for driving said conveying element, said conveying element being pivotally mounted in operative position on said support and being swingable relative to said support about one end of said belt to move said conveying element into and out of normal working position.

4. In combination in a grain conveying assembly, a housing, a conveying element including a belt and fingers rearwardly bent with respect to the direction of their travel, means mounted adjacent the discharge point of the conveyor for freeing said fingers from any material which tends to adhere to them as they reach the said means, and means for movably mounting said conveying element within said housing to permit movement of said conveying element into and out of said housing.

5. In combination in a grain conveying assembly, a conveyor comprising a belt with fingers located within the housing and adapted to receive and convey grain, and means for movably mounting said conveyor in operative position within said housing and permitting the discharge end of said conveyor to be moved out of said housing, and a comb adjacent the discharge point of the conveyor adapted to free said fingers from any material which tends to adhere to them as they reach the comb, said comb being movable out of said housing along with the discharge portion of said conveyor.

6. In combination in a grain conveying assembly, a housing, a conveyor comprising a belt with fingers located within said housing and adapted to receive and convey grain beneath the conveyor, means for movably mounting said conveyor in operative position within said housing and permitting the discharge end of said conveyor to be moved out of said housing, a comb adjacent the discharge point of said conveyor adapted to free said fingers from any material which tends to adhere to them as they reach said comb, and a beater adjacent the discharge point of said conveyor adapted to receive the grain as it is discharged from said conveyor and to assist in conveying it further.

7. In combination in a grain conveying assembly, a housing, a conveyor including a movable member carrying a projection, means for movably mounting said conveyor in operative position within said housing and permitting the discharge end of the conveyor to be moved out of said housing while permitting the receiving end of the conveyor to remain mounted in position in the housing, said conveyor being adapted to receive and convey grain beneath it within the housing, a beater adjacent the discharge point of the conveyor adapted to receive the grain and to assist in conveying it further, and a fixed member adjacent the discharge point of the conveyor adapted to free said projection from any material which tends to adhere to it as it reaches said fixed member.

8. In combination in a grain conveying assembly, a housing, a conveyor including a movable member carrying projections, means for movably mounting said conveyor in operative position within said housing and permitting the discharge end of the conveyor to be moved out of said housing while permitting the receiving end of the conveyor to remain mounted in position in said housing, said conveyor being adapted to receive and convey grain beneath it within the housing, a beater adjacent the discharge point of the conveyor adapted to receive the grain and to assist in conveying it further, and fixed members adjacent the discharge point of the conveyor adapted to free said projections from any material which tends to adhere to them as they reach said fixed members, said fixed members being movable out of said housing along with the discharge end of said conveyor.

9. In combination in a grain conveying assembly, a housing, a conveyor element within said housing, said conveying element comprising a frame, driving rolls mounted at spaced points thereon, an endless conveying belt provided with fingers and mounted to travel over said rolls, said frame at the inlet end of said conveyor being pivotally mounted with respect to said housing, and said conveyor element being swingable about said pivotal mounting of said frame to move the discharge end of said conveyor element from normal working position in said housing to a point outside thereof, a second conveyor associated with said housing and operative to discharge grain therein at a point adjacent the receiving end of said conveying belt whereby said fingers of said conveyor element when the latter is in working position may engage grain discharged from said second conveyor and move said grain longitudinally of and beneath said belt to the discharge end thereof.

10. In combination in a combine including a harvesting sickle and a grain threshing device, a conveyor for conveying grain from the harvesting sickle, and a belt conveyor for conveying grain to the threshing device and arranged to receive material from the first conveyor, the belt conveyor positioned and operating so as to pull material from the first conveyor, and said belt conveyor adapted to move the material which it conveys beneath itself.

11. In combination in a combine including a harvesting sickle and a grain threshing device, a conveyor for conveying grain from the harvesting sickle, and a belt conveyor for conveying grain to the threshing device and arranged to receive material from the first conveyor, the belt conveyor positioned and operating so as to pull material from the first conveyor.

12. In combination in a combine, a screw conveyor and a belt conveyor arranged to receive material from the screw conveyor, the belt conveyor positioned and operating so as to pull material from the screw conveyor, the belt conveyor adapted to move the material which it conveys beneath itself.

13. In combination in a combine, a screw conveyor and a belt conveyor arranged to receive material from the screw conveyor, the belt conveyor positioned and operating so as to pull material from the screw conveyor, the belt conveyor adapted to move the material which it conveys beneath itself, and a fixed comb adapted to remove material from the belt conveyor.

WILLIAM I. BALLENTINE.
AMADEE J. KNAPP.